United States Patent [19]

Keller

[11] Patent Number: 4,671,873
[45] Date of Patent: Jun. 9, 1987

[54] FILTER ELEMENT WITH PERMANENTLY APPLIED SEALING STRIPS

[75] Inventor: Egon Keller, Aarbergen, Fed. Rep. of Germany

[73] Assignee: Seitz-Filter-Werke Theo & Geo Seitz GmbH und Co., Bad Kreuznach, Fed. Rep. of Germany

[21] Appl. No.: 678,666

[22] Filed: Dec. 6, 1984

[30] Foreign Application Priority Data

Dec. 7, 1983 [DE] Fed. Rep. of Germany ....... 3344187

[51] Int. Cl.⁴ ............................................. B01D 25/02
[52] U.S. Cl. .................................. 210/232; 210/445; 210/450; 210/506; 55/502; 55/524
[58] Field of Search ...................... 210/314, 433.2, 450, 210/484, 488, 489, 490, 493.5, 497.2, 500.2, 504, 506, 232, 44.5, 507; 55/502, 524

[56] References Cited

U.S. PATENT DOCUMENTS

| | | | |
|---|---|---|---|
| 3,972,694 | 8/1976 | Head | 55/524 |
| 4,093,437 | 6/1978 | Ichihara et al. | 55/524 |
| 4,128,251 | 12/1978 | Gaither et al. | 55/502 |
| 4,212,746 | 7/1980 | Tholema et al. | 210/507 |
| 4,404,006 | 9/1983 | Williams et al. | 55/502 |
| 4,422,861 | 12/1983 | Dusza | 55/524 |
| 4,460,388 | 7/1984 | Fukami et al. | 55/524 |
| 4,512,891 | 4/1985 | Wright et al. | 55/497 |
| 4,514,302 | 4/1985 | van Zon et al. | 55/502 |

FOREIGN PATENT DOCUMENTS

| | | | |
|---|---|---|---|
| 2713830 | 10/1977 | Fed. Rep. of Germany | 210/504 |
| 3200443 | 8/1982 | Fed. Rep. of Germany | |
| 3239687 | 10/1982 | Fed. Rep. of Germany | |
| 196711 | 11/1984 | Japan | 210/504 |
| 572126 | 9/1945 | United Kingdom | 210/507 |

OTHER PUBLICATIONS

The American Heritage Dictionary of the English Language, William Morris, 1976, by Houghton Mifflin Company, Boston, Mass., p. 818.

Primary Examiner—Richard V. Fisher
Assistant Examiner—Wanda L. Millard
Attorney, Agent, or Firm—Becker & Becker, Inc.

[57] ABSTRACT

A filter element that includes a membrane which is to be detachably or non-detachably retained between fixed parts of a filter device, and which is provided on at least one of its sides with a permanently applied strip of sealing material. The strip projects relative to the surface of the membrane at that side, and extends over the entire length which is to be sealed. This sealing strip is thus a permanent part of the filter element. The sealing strip can be arranged directly at the rim portion of the membrane, and can at least partially encompass this rim. The provision of sealing strips so that they are opposite one another on both sides of the membrane is particularly advantageous. The sealing material can be applied in a flowable state, and can be subsequently cured to an elastomeric state. A particularly secure connection between the membrane and the sealing strip or strips may be achieved by penetration of the sealing material into the membrane.

2 Claims, 5 Drawing Figures

FILTER ELEMENT WITH PERMANENTLY APPLIED SEALING STRIPS

FIELD OF THE INVENTION

The present invention relates to a filter element and to a method of manufacturing such an element.

DESCRIPTION OF PRIOR ART

It is known to sealingly mount a filter membrane between fixed parts of a filter device by positioning an O-ring between the membrane and each of the fixed parts. The membrane is thereby clamped and sealed between the O-rings and the fixed parts of the filter device, for example the housing thereof. This method of sealing requires considerable time and cost in the assembly of filter modules or the exchange of membranes in flat filter devices, as an increased number of movable parts is needed and must be placed together during the assembly. The O-rings must be inserted in an exact position during assembly, which constitutes a source of assembly faults notwithstanding the exercise of all care. Due to the increased number of parts there is also the risk during handling and assembling of filters to be sterilized that components sterilized in autoclaves are rendered unsterile through hand contact. This applies particularly to the insertion of the O-rings into annular grooves of the filter housings if extreme care is not observed during loading and reassembly. Cleaning of the O-rings and the annular grooves in the housings also represents an additional operation requiring great care. Last, but not least, O-rings tend to become brittle after repeated usage. In order to counter the risk of failure of an O-ring and consequent loss of filtrate during use of the filter, such O-rings must be exchanged frequently.

It is also known to weld the membrane tightly to the filter housing when such housing is made of plastics material. However, this method of sealing virtually precludes exchanging of the filter membrane, because a secure seal cannot be guaranteed if repeated welding of the membrane is carried out. This method of sealing is therefore practicable only when the filter housing is to be thrown away with the filter membrane when the membrane has been used.

In German (Federal Republic) patent specification (Offenlegungsschrift) No. 32 00 443 there is described a filtration device for flat filter blanks in which the filter blank is placed between two perforated plates. Sprayed onto the circumferential rim of each perforated plate is a U-shaped plastics material molded part of polyforrmaldehyde (PFA) or polytetrafluoroethylene (PTFE), which is convex towards the filter blank and forms an encircling ring seal. This known device, however, has scope for only limited use in conjunction with filter membranes, because membranes do not offer the depth of impression necessary for the secure sealing to be produced by the molded annular seals on the plates. In practice, therefore, either the sealing is unreliable or else the membrane is crushed in places.

Similar difficulties are also presented by a method of sealing proposed in the specification of German (Federal Republic) Patent Application No. P 32 39 687.2, according to which assembly and sealing rings with annular beads are to be placed against inner and outer circumferential regions of carrier plates for filter membranes.

It would thus be desirable to provide a method of sealing a filter membrane relative to fixed parts of a filter device, for example a filter housing, in which there is no risk of damage of the membrane and an intimate, leakage-tight sealing between the membrane and the fixed parts is achieved in a simple, economic and wear-free manner.

According to a first aspect of the present invention there is provided a filter element comprising a filter membrane having a filtration region for fluid filtration and a sealing region outwardly of the filtration region at which the membrane is sealable at least along one side thereof relative to a rigid support member. The membrane is provided at said at least one side thereof and over the entire length of said sealing region with a permanently applied strip of sealing material projecting outwardly of the surface of the membrane at that side.

Such sealing strip thus represents a permanent part of the filter membrane and remains in use only as long as the membrane itself. Handling is significantly simplified through the connection of the sealing strip with the membrane and filtering operations can be more certain. Since new sealing strips are introduced with each new filter membrane, any risk of leakage due to aging of the seals is excluded.

In a preferred embodiment, the sealing strip is printed on said at least one surface of the membrane. Since the sealing material during application is liquid to pasty, the sealing material penetrates into the pores of the membrane and forms an intimate connection therewith. At the same time, the pressure strength of the membrane in the sealing region is significantly increased through the penetration of the sealing material, whilst the sealing strip protruding relative to the surface of the membrane offers an appreciable depth of impression for a co-operating support member.

The sealing strip can be arranged at a spacing from the circumferential edge of the membrane or the sealing strip can be arranged directly at the circumferential rim portion of the membrane so that the sealing strip at least partially encloses the circumferential edge thereof.

The sealing strip can be applied to just one surface of the membrane or two such strips can be applied to both sides of the membrane to be opposite each other. This latter construction is particularly suitable for membranes which are to be arranged more or less freely between two plate-shaped or other parts of a filter device or filter housing. The arrangement of sealing strips at both sides can be combined with the arrangement directly at the circumferential rim portion of the membrane in the sense that the two strips project beyond the circumferential edge of the membrane and are connected together, with bases thereof lying against each other, in a strip-shaped region projecting relative to the circumferential edge.

Preferably, such sealing strip has a bead-shaped arcuate profile. Such a profile can be produced particularly advantageously through printing-on of the strip. It also has the advantage that sharp edges and cavities, which are disadvantageous for rinsing and cleaning, are avoided.

The sealing material preferably comprises an elastomeric material, for example on a base of silicone rubber, epoxy resin, urethane resin or the like. Such elastomeric material can be easily set in its Shore hardness through simple measures, for example softness and selection of the material composition. The sealing material in that case preferably consists of a substance which is applied as a liquid to softly pasty mass and converted on the membrane into a rubber-elastic or elastomeric state.

According to a second aspect of the present invention there is provided a method of manufacturing a filter element comprising the steps of providing a filter membrane having a filtration region for fluid filtration and a sealing region outwardly of the filtration region at which the membrane is to be sealable at at least one side thereof to a rigid support member, applying a hardenable sealing material in flowable state to said at least one side of the membrane and over the entire length of the sealing region in such a manner that the sealing material penetrates into the membrane but projects outwardly of the surface of the membrane at that side, and causing or allowing the sealing material to harden after such penetration has taken place.

Preferably, the sealing material is a vulcanizable or polymerizable material and is applied in an unvulcanized or partially vulcanized or monomeric or partially polymerized state, the material being, for example on a base of silicone caoutchouc, epoxy resin, urethane resin or the like and applied in liquid to pasty state. After penetration into the membrane pores, it is vulcanized or polymerized under the influence of air humidity and/or heat. This vulcanization or polymerization can take place in, for example, an oven with slightly heated air partially saturated by water. The sealing material can, before application to the membrane, be set in its composition to the desired Shore hardness of the strip after vulcanization or polymerization.

Examples of the method embodiments of the filter element of the present invention will now be more particularly described with reference to the accompanying drawings, in which.

Figure 1:
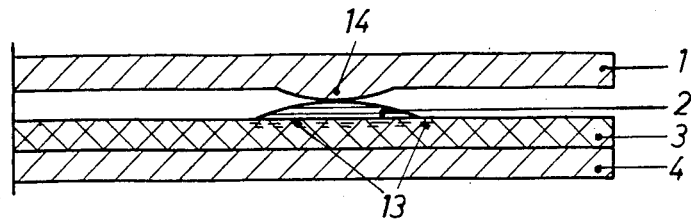
FIG. 1 is a schematic sectional view of a first filter element embodying the invention, the element being shown mounted in a sealing device.

Referring now to the drawings, there is shown in FIG. 1 a filter element comprising a filter membrane 3 printed on one side with a strip 2 of sealing material. During the application of the sealing material, this penetrates into the pores of the membrane 3 as indicated schematically at 13. As a result, an intimate connection is created between the strip 2 and the membrane 3, whereby an increase in the pressure strength of the membrane 3 in the sealing region is achieved. The filter element, formed by the application of the strip 2 to the membrane 3, can have any shape and size depending on the intended use. Thus, such filter elements can be adapted for use in filter modules such as filter cartridges, plate filters and the like, in flat filtration devices. In the embodiment of FIG. 1, the filter element is placed on a rigid, for example dish-shaped or plate-shaped, filter device part 4 and a second rigid filter device part 1 is arranged at a spacing above the membrane 3, the part 1 having a sealing bead 14 engaging the strip 2. The filter device parts 1 and 4 can be, for example, parts of a filter housing or module and of a variety of constructions.

The parts 1 and 4 and the membrane 3 are sealed relative to each other in leak-proof manner by being pressed together. This pressing together is maintained by suitable detachable or non-detachable means.

Figure 2:
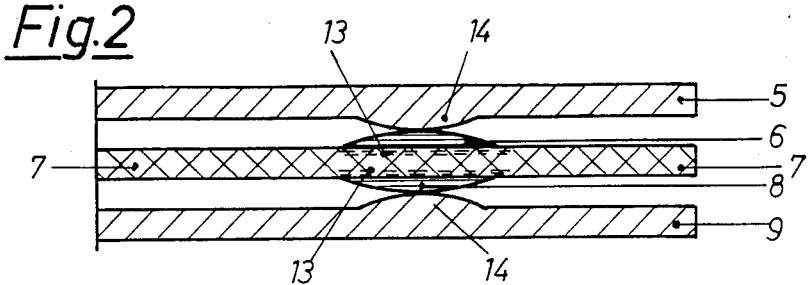
FIG. 2 is a schematic sectional view of a second filter element embodying the invention, the element being shown mounted in a sealing device.

A filter membrane 7 printed at both sides with sealing material strips 6 and 8 is provided in the embodiment of FIG. 2. During application of the strips 6 and 8, the sealing material penetrates, as indicated at 13, into the pores of the membrane 7 at both sides thereof and forms an intimate connection between the membrane 7 and the strips 6 and 8 as well as a reinforcement of the pressure strength of the membrane in its sealing region. Such a filter element, with sealing strips at both sides, can also be used in filter modules, for example filter cartridges, plate filters and the like, and in flat filtration devices. In the embodiment of FIG. 2, the membrane 7 is placed between two rigid filter device parts 5 and 9, each of which has a bead facing the membrane 7 and engaging a respective one of the strips 6 and 8.

Figure 3:
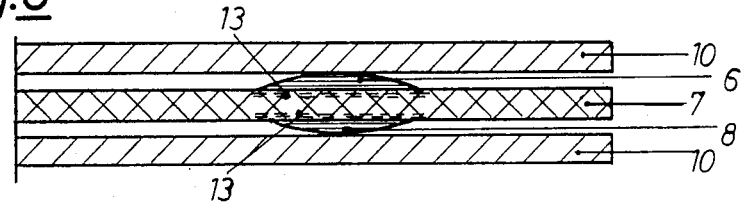
FIG. 3 is a view similar to FIG. 2 but with the filter element mounted in a different filter device.

In the embodiment of FIG. 3, the filter element, which is constructed in a manner like that of FIG. 2 and has sealing strips 6 and 8 at both sides, is placed between two flat filter device parts 10 so that the strips 6 and 8, which protrude relative to the surfaces of the membrane 7, sealingly co-operate with respective surface portions of the parts 10.

In the embodiment of FIGS. 2 and 3, a secure sealing is produced by pressing together the filter device parts 5, 9 or 10. These parts are therefore fixed or secured in their compressed state for the maintenance of the seal.

Figure 4:
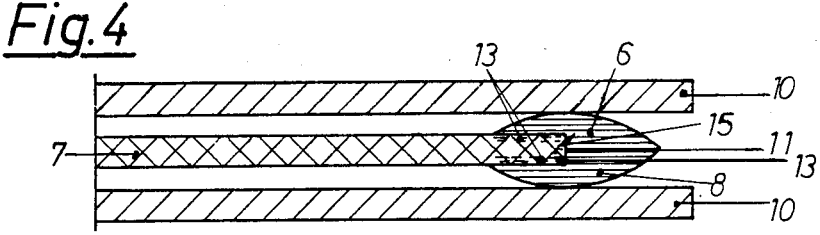
FIG. 4 is a schematic sectional view of a third filter element embodying the invention, showing the element mounted in a filter device.

A filter membrane 7 which is provided at both sides with respective sealing strips 6 and 8 is also shown in FIG. 4. However, the strips 6 and 8 in this embodiment are arranged directly in the region of the circumferential edge 15 of the membrane 7 in such a manner that the strips extend beyond the edge 15 and thereby meet each other in an annular region 11 at their bases, the strips together enclosing the rim portion of the membrane 7. The strips are connected to each other at their bases by reaction of the constituent vulcanizate or polymerizate of the strips. The membrane 7 in the embodiment of FIG. 4 is placed between two flat end rigid filter device parts 10, as in the case of FIG. 3. The strips 6 and 8 effect a secure sealing in conjunction surface portions of the parts 10 when these parts are pressed towards each other. In order to maintain this sealing, it is only necessary to secure the parts 10 by detachable or non-detachable means in their pressed-together position.

Figure 5:
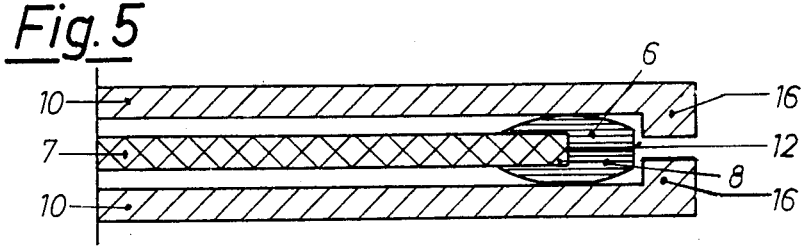
FIG. 5 is a schematic view of a fourth filter element embodying the invention, showing the element mounted in a filter device.

FIG. 5 shows an embodiment in which the filter membrane 7 is provided, in a manner like that of FIG. 4, with sealing strips 6 and 8 at both sides directly at its rim portion. In contrast to the embodiment of FIG. 4, the rigid filter device parts 10 in FIG. 5 are provided at their rims with projections 16 directed towards each other. These projections 16 can be annular or of discrete segments and serve as limiting abutments when pressing together the parts 10. The strips 6 and 8 are cut off at their outer ends at 12 to prevent the strips from coming into contact with the projections 16 and interfering with the pressing together of the parts 10.

As in the other embodiments, the parts 10 are to be secured by detachable or non-detachable means in their pressed-together position in order to maintain a seal.

Filter elements embodying the present invention may include all types of filter membranes, for example membranes which have a sealing region only at the outer circumferential region and membranes with one or more passages and with sealing regions surrounding such passages. Moreover, the sealing region may divide the membrane area in order to separate two or more filtration regions.

The present invention is, of course, in no way restricted to the specific disclosure of the specification and drawings, but also encompasses any modifications within the scope of the appended claims.

What I claim is:

1. In a filter element for a filter device having rigid parts, comprising:

a filter membrane insertable between rigid parts of the filter device, said filter membrane having at least one filtration region, and at least one sealing region for sealing said filter membrane relative to at least one of said rigid filter device parts;

the improvement in combination therewith wherein said filter membrane is provided with permanently applied strips of sealing material disposed on and adhered contiguous with a surface of said filter membrane associated therewith; each of said permanently applied strips of sealing material projecting arcuately over the associated surface of said filter membrane, and extending over the entire length of the pertaining sealing region such that sealing-off is accomplished solely by pressing together of filter device parts in a fluid-tight manner without any welding respectively melting of said applied strip of sealing material in any way whatever so that any danger of damaging of said filter membrane is precluded even though an intimate leakproof connection between said filter membrane and said rigid parts of the filter device results therefrom when pressed together collectively in a fluid-tight manner subject to replacement of a consumed filter membrane without any throw-away of said rigid parts of the filter device;

said strip of sealing material being printed on said surface of said filter membrane; said strip of sealing material being disposed at a circumferential edge portion, and at least partially covers the circumferential edge of said membrane; there being provided two of said strips of sealing material, one disposed on each side of said filter membrane, and opposite each other; said strips of sealing material together cover and project beyond the circumferential edge of said membrane; said strips being connected to one another along a planar zone which extends outwardly from said edge; said sealing material comprising elastomeric material, said elastomeric material being selected from the group consisting of silicone rubber, epoxy resin, and urethane resin, said sealing material comprising a resilient material which is hardened from a mass applied in a liquid to pasty state to said filter membrane.

2. A filter element in combination according to claim 1, in which each of said strips of sealing material has a convex surface which faces outwardly from the surface of said filter membrane.

* * * * *